United States Patent [19]

Den Hartog et al.

[11] Patent Number: 5,266,406
[45] Date of Patent: Nov. 30, 1993

[54] WATERBASED METHYLOL (METH)ACRYLAMIDE ACRYLIC POLYMER AND AN ACRYLIC HYDROSOL COATING COMPOSITION

[75] Inventors: Herman C. Den Hartog, Rochester, Mich.; Eileen E. Konsza, Swedesboro, N.J.; James F. Matthews; Ervin R. Werner, Jr., both of Levittown, Pa.

[73] Assignee: E. I. Du Pont de Nemours and Company, Wilmington, Del.

[21] Appl. No.: 2,992

[22] Filed: Jan. 11, 1993

Related U.S. Application Data

[60] Division of Ser. No. 622,266, Dec. 5, 1990, Pat. No. 5,219,916, which is a continuation-in-part of Ser. No. 434,865, Nov. 8, 1989, abandoned.

[51] Int. Cl.$^5$ .................................. B32B 27/00
[52] U.S. Cl. ......................... 428/423.1; 428/424.4; 428/463
[58] Field of Search ............... 524/521, 522, 523, 524; 428/463, 423.1, 424.4

[56] References Cited

U.S. PATENT DOCUMENTS 4,730,020 3/1988 Wilfinger et al. .................. 524/555

Primary Examiner—Joseph L. Schofer
Assistant Examiner—Jeffrey T. Smith
Attorney, Agent, or Firm—Hilmar L. Fricke

[57] ABSTRACT

A waterbased coating composition formed of an acrylic latex and an acrylic hydrosol dispersed in an aqueous carrier and has a pH of about 7–10; wherein the binder is a blend of an acrylic latex polymer having a particle size of about 0.06–0.20 microns and an acrylic hydrosol polymer having a particle size of less than 0.30 microns; wherein the blend contains a methylol (meth)acrylamide acrylic latex polymer of polymerized monomers of alkyl methacrylate, alkyl acrylate or mixtures thereof, 1–15% by weight of methylol methacrylamide, methylol acrylamide or mixtures thereof, 0.5–10% by weight of ethylenically unsaturated carboxylic acid having reactive carboxyl groups, 0.5–10% by weight of ethylenically unsaturated hydroxyl monomer and the carboxyl groups of the carboxylic acid component of the polymer are reacted with ammonia or an amine; and an acrylic hydrosol polymer of methylol (meth)acrylamide acrylic polymer containing about 0.5–10% by weight of an ethylenically unsaturated carboxylic acid, 0.5–10% by weight of ethylenically unsaturated hydroxyl monomer and the carboxyl groups of the carboxylic acid of the polymer are reacted with ammonia or an amine;

the composition forms an automotive quality clear coat and/or pigmented color coat and the acrylic hydrosol polymer can be used to form an automotive quality sealer composition.

7 Claims, No Drawings

WATERBASED METHYLOL (METH)ACRYLAMIDE ACRYLIC POLYMER AND AN ACRYLIC HYDROSOL COATING COMPOSITION

CROSS REFERENCE TO RELATED APPLICATIONS

This is a division of application Ser. No. 07,622,266, filed Dec. 5, 1990, now U.S. Pat. No. 5,219,916, which is a continuation-in-part of application Ser. No. 07,434,865, filed Nov. 8, 1989, now abandoned.

BACKGROUND OF THE INVENTION

This invention is directed to a waterbased coating composition and in particular to a waterbased coating containing a methylol (meth)acrylamide acrylic polymer and an acrylic hydrosol.

Methylol (meth)acrylamide acrylic polymers are polymers containing polymerized monomers of methylol methacrylamide or methylol acrylamide or any mixtures thereof.

Water based coating compositions useful for base coats and clear coats for automotive applications are shown in Wilfinger et al U.S. Pat. No. 4,730,020, issued Mar. 8, 1988. Waterbased coating compositions containing hydrosols are shown in Cowles et al U.S. Pat. No. 4,797,444 issued Jan. 10, 1989, Aluotto et al U.S. Pat. No. 4,477,609 issued Oct. 16, 1984. The preparation of acrylic hydrosols is shown in Hoefer et al U.S. Pat. No. 4,623,695 issued Nov. 18, 1986. However, none of the compositions shown in the art form finishes having properties that are required in particular for finishing or repair of exterior finishes of automobiles and trucks.

To date, solvent based finishes have been used to repair and refinish the exterior of automobiles and trucks. Finishes of these solvent based compositions provided the required color match, cured at ambient temperatures, had excellent adhesion to the substrate and gave properties such as gloss, hardness, distinctness of image required for the exterior of automobiles and trucks. To reduce solvent emissions, waterbased paints were suggested for use. However, none of the known water based paints form finishes that have the necessary properties for automotive and truck use.

Waterbased color coat for color coat/clear coat finish, i.e., a finish having a pigmented colored layer and a top clear layer, for automobiles and trucks now is coming into use for the manufacturing of original equipment. To repair such a finish, it would be very desirable and usually necessary to use a waterbased finish to match the original color particularly when metallic flake pigments are present in the color coat.

SUMMARY OF THE INVENTION

A waterbased coating composition of an acrylic latex and an acrylic hydrosol containing about 10-30% by weight of film forming binder dispersed in an aqueous carrier and having a pH of about 7-10; wherein the binder is a blend of an acrylic latex polymer having a particle size of about 0.06-0.20 microns and an acrylic hydrosol polymer having a particle size of less than 0.30 microns; the blend contains about a. 60-90% by weight, based on the weight of the binder, of a methylol (meth)acrylamide acrylic latex polymer of polymerized monomers of alkyl methacrylate, alkyl acrylate or mixtures thereof, 1-15% by weight, based on the weight of the acrylic polymer, of methylol methacrylamide, methylol acrylamide or mixtures thereof, 0.5-10% by weight, based on the weight of the acrylic polymer, of ethylenically unsaturated carboxylic acid, 0.5-10% by weight, based on the weight of the acrylic polymer, of ethylenically unsaturated hydroxyl containing monomer, and the acrylic polymer has a glass transition temperature of $-40°$ to $+40°$ C. and a weight average molecular weight of 500,000 to 3,000,000, the carboxyl groups of the carboxylic acid are reacted with ammonia or an amine; and b. 10-40% by weight, based on the weight of the binder, of an acrylic hydrosol polymer of a methylol (meth)acrylamide acrylic polymer containing about 0.5-10% by weight, based on the weight of the polymer, of an ethylenically unsaturated carboxylic acid, 0.5-10% by weight, based on the weight of the polymer, of an ethylenically unsaturated hydroxyl containing monomer and has a weight average molecular weight of about 5,000-75,000 and the carboxyl groups of the carboxylic acid of the polymer are reacted with ammonia or an amine;

the composition forms an automotive quality clear coat and/or pigmented color coat and can be used as primer composition; the acrylic hydrosol polymer can be used to form an automotive quality sealer composition. Articles coated with a clear coat which may or may not be the composition of this invention and a pigmented color coat of the coating composition of this invention and a process for forming the coated articles are also part of this invention.

DETAILED DESCRIPTION OF THE INVENTION

The term "latex" as used herein means a dispersion in an aqueous carrier of polymer particles having a particle size of about 0.06-0.20 microns and a weight average molecular weight of greater than 500,000.

The term "hydrosol" as used herein means a fine dispersion in an aqueous carrier of polymer particles having a particle size of less than 0.30 microns, preferably less than 0.15 microns and more preferably less than 0.01 microns and a weight average molecular weight of less than 100,000.

The coating composition of the invention is stable for extended periods of time, has a very low VOC (volatile organic content), can be pigmented with all existing commercial pigments used for automobiles and trucks and due to the compatible nature of the acrylic latex and the acrylic polymer hydrosol forms finishes that are hard, glossy, weatherable and durable. In particular, the composition has excellent adhesion to a variety of substrates such as previously painted substrates, cold rolled steel, phosphatized steel, steel coated with conventional primers such as electrodeposition primers that typically are crosslinked epoxy polyesters and various epoxy resin, alkyd resin repair primers, plastic substrates such as polyester reinforced fiber glass, reaction injection molded urethanes and partially crystalline polyamides. A clear coat can be applied to a layer of the pigmented composition to provide a clear/color coat finish. The coating composition used for the clear coat can be the coating composition of this invention or another compatible aqueous or solvent based coating composition.

The coating composition can be used as a primer over cold rolled steel, treated steel such as phosphatized steel or the aforementioned plastic substrates. The primer provides a surface to which a topcoat will adhere such as a topcoat of the coating composition of this invention as described above.

The coating composition has a film forming binder content of about 10-30% by weight and correspondingly, about 90-70% by weight of an aqueous carrier which is primarily water but often contains small amounts of organic solvents for the binder. The composition may be used as a clear coating composition which may contain very small amounts of pigment to eliminate color such as yellowing. Generally, the composition is pigmented and contains pigments in a pigment to binder weight ratio of about 1:100-200:100.

The film forming binder of the composition contains about 60-90% by weight of the methylol (meth)acrylamide acrylic latex polymer and correspondingly about 10-40% by weight of an acrylic hydrosol polymer. Preferably, the binder contains about 65-85% by weight of the acrylic latex polymer and 35-15% by weight of the the acrylic hydrosol polymer. Preferably, for solid color compositions, i.e. compositions in which metallic pigments such as aluminum flake are not used, the binder contains about 70% acrylic latex polymer and 30% acrylic hydrosol polymer and for metallic colors, i.e. compositions containing aluminum flake, the binder contains about 80% acrylic latex polymer and 20% acrylic hydrosol polymer.

The latex and hydrosol polymers each contain methylol (meth)acrylamide and form an aqueous polymer system that crosslinks on drying under ambient conditions or at elevated temperatures to form a crosslinked film or finish having excellent adhesion, water resistance, solvent resistance, hardness, durability and weatherablity as is required for an automotive or a truck finish. The hydrosol polymer preferably contains the same or similar monomers as the latex polymer and is compatible with the latex polymer and the polymers readily crosslink on drying. In particular, the latex polymer and the hydrosol polymer contain the same or very similar amounts of carboxyl and hydroxyl monomers which improves the humidity performance of finishes formed from coatings containing such polymers.

Because the hydrosol polymer is relatively low in molecular weight in comparison to the latex polymer, it is more mobile than the latex polymer particles and fills the voids formed by the latex polymer particles upon drying. This substantially improves the physical properties of the resulting film or finish.

The methylol (meth)acrylamide of the latex and hydrosol polymers reacts with itself or with another hydroxy group thereby forming a crosslinked film or finish. The crosslinking reaction occurs with the elimination of water on drying and is catalyzed by acid. Preferably, to achieve an adequate ambient temperature cure, the latex contains hydroxy alkyl acrylate or methacrylate and acid is neutralized with ammonia or a volatile amine. As the film dries, it becomes slightly acidic and crosslinking occurs.

The acrylic latex polymer is formed by conventional emulsion polymerization by emulsifying a mixture of monomers, water, surfactant and polymerization catalyst and charging the resulting emulsion into a conventional polymerization reactor and heating the constituents in the reactor to about 60°-95° C. for about 15 minutes to 8 hours and then the resulting polymer is neutralized with ammonia or an amine. The size of the polymeric particles of the latex is about 0.06-0.20 microns. The resulting polymer has a hydroxyl no. of 2-100, a glass transition temperature of −40° to +40° C. and a weight average molecular weight of about 500,000-3,000,000.

All molecular weights herein are measured by gel permeation chromatography using polystyrene as the standard.

Typically useful catalysts are ammonium persulfate, hydrogen peroxide, sodium meta bisulfite, hydrogen peroxide, sodium sulfoxylate and the like.

Typically useful surfactants are nonylphenoxypolyethyleneoxy ethanol sulfate, allyl dodecyl sulfosuccinate, alkyl phenoxy polyethylene oxyethanol, sodium lauryl sulfate and mixtures thereof. One preferred surfactant is a mixture of nonylphenoxy polyethyleneoxy ethanol sulfate and allyl dodecyl sulfosuccinate.

The acrylic latex polymer contains about 1-15% by weight of polymerized methylol methacrylamide, methylol acrylamide or any mixtures thereof.

The acrylic latex polymer preferably contains sufficient polymerized hydroxy alkyl methacrylate or acrylate having 2-4 carbon atoms in the alkyl group to provide the polymer with a hydroxyl no. of 2-100. Usually, about 0.5-10% by weight of hydroxy alkyl acrylate or methacrylate is used. Typically useful monomers are hydroxyethyl acrylate, hydroxylpropyl methacrylate, hydroxybutyl methacrylate, hydroxyethyl methacrylate, hydroxylpropyl acrylate. Other useful polymerizable constituents are reaction products of an alkyl methacrylate or acrylate and a lactone. A constituent of this type is "Tone" 100 made by Union Carbide which is believed to be the reaction product of hydroxyethyl acrylate and a lactone.

The acrylic latex polymer also contains sufficient polymerized monoethylenically unsaturated acid monomers. Typically useful monoethylenically unsaturated acids are methacrylic acid, acrylic acid, itaconic acid, styrene sulfonic acid and salts thereof. Usually, these unsaturated acids are used in an amount of about 0.5-10% by weight, based on the weight of the polymer.

The remaining constituents of the acrylic latex polymer are polymerized alkyl acrylates and/or methacrylates preferably, having about 1-12 carbon atoms in the alkyl group. These constituents are blended to provide the desired polymer glass transition temperature. Typically useful monomers are methyl methacrylate, ethyl acrylate, propyl acrylate, propyl methacrylate, butyl methacrylate, isobutyl methacrylate, butyl acrylate, isobutyl acrylate, hexyl acrylate, hexyl methacrylate, 2-ethylhexyl methacrylate, 2-ethylhexyl acrylate, lauryl methacrylate and the like. Also, up to about 30% by weight of styrene can be used to form the acrylic latex polymer.

The following are particularly useful acrylic latex polymers:

an acrylic polymer containing about 30-40% by weight methyl methacrylate, 10-20% by weight styrene, 35-45% by weight 2-ethylhexyl acrylate, 1-6% by weight methylol methacrylamide, 1-5% by weight hydroxyethyl acrylate and 1-5% by weight methacrylic acid;

an acrylic polymer containing about 25-35% by weight methyl methacrylate, 10-20% by weight styrene, 45-55% by weight 2-ethylhexyl acrylate, 1-6% by weight methylol methacrylamide, 1-5% by weight hydroxyethyl acrylate and 1-5% by weight methacrylic acid;

an acrylic graft copolymer of stage I of 10-30% by weight of methyl methacrylate, 1-5% by weight methylol methacrylamide, 70-89% by weight butyl acrylate grafted to stage II of 70-80% by weight of butyl acrylate, 5-15% by weight methylol methacrylamide, 5-15% by weight hydroxyethyl acrylate and 5-9% by weight methacrylic acid; and a three stage acrylic graft copolymer polymer, wherein stage I and stage II each comprise methyl methacrylate and butyl acrylate, and stage III comprises methyl methacrylate, butyl acrylate and methylol methacrylamide.

The acrylic hydrosol polymer is formed by conventional solution polymerization by adding a mixture of monomers, solvent and polymerization catalyst to a conventional polymerization reactor and heating the constituents in the reactor to reflux temperature of the solvent of about 60°-120° C. for about 15 minutes to 8 hours to form a polymer solution. Then water and ammonia or an amine are added to the polymer solution to form a hydrosol. The size of the polymeric particles of the hydrosol is less than 0.30 microns. The resulting polymer has a hydroxyl no. of 2-100, a glass transition temperature of −40° to +45° C. and a weight average molecular weight of about 5,000-75,000.

Typical catalysts used to form the hydrosol polymer, benzoyl peroxide, hydrogen peroxide and other peroxy compounds used for acrylic free radical polymerization, tertiary butylperacetate, tertiary butyl peroctoate, azoisobutyronitrile and other "Vazo" catalysts that are used for acrylic free radical polymerization.

Typically useful solvents are alcohols such as n-propanol, ethanol, methanol, n-butanol, mono and dialkyl ethers of ethylene glycol, such as ethylene glycol monobutyl ether, ethylene glycol monobutyl ether acetate, ethylene glycol dibutyl ether and the like.

The acrylic hydrosol polymer contains about 1-30% by weight of polymerized methylol methacrylamide, methylol acrylamide or any mixtures thereof.

The acrylic hydrosol polymer preferably contains sufficient polymerized hydroxy alkyl methacrylate or acrylate having 2-4 carbon atoms in the alkyl group to provide the polymer with a hydroxyl no. of 2-100. Usually, about 0.5-10% by weight of hydroxy alkyl acrylate or methacrylate is used. Typically useful monomers are shown above. Other useful polymerizable constituents are reaction products of an alkyl methacrylate or acrylate and a lactone such as "Tone" 100 described above.

The acrylic hydrosol polymer also contains sufficient polymerized monoethylenically unsaturated acid monomers. Typically useful monoethylencially unsaturated acids are methacrylic acid, acrylic acid, itaconic acid, styrene sulfonic acid and salts thereof. Usually, these unsaturated acids are used in an amount of about 0.5-10%by weight, based on the weight of the polymer.

The remaining constituents of the acrylic hydrosol polymer are polymerized alkyl acrylates and/or methacrylates preferably having about 1-12 carbon atoms in the alkyl group. These constituents are blended to provided the desired polymer glass transition temperature. Typically useful monomers are described above. Also, up to about 40% by weight of styrene can be used to form the hydrosol polymer.

The following are particularly useful acrylic hydrosol polymers:
an acrylic polymer containing about 25-50% by weight methyl methacrylate (MMA), 10-30% by weight styrene (S), 25-50% by weight 2-ethylhexyl acrylate (2-EHA) or 2-ethylhexyl methacrylate (2-EHMA), 2-10% by weight methylol methacrylamide (MOLMAM), 2-10% by weight hydroxyethyl acrylate (HEA) and 1-6% by weight methacrylic acid (MMA);

| MMA | S | 2-EHA | MOLMAN | HEA | MAA |
|---|---|---|---|---|---|
| 31 | 22 | 34 | 7 | 3 | 3 |
| 47 | 15 | 30 | 3 | 2 | 3 |
| 44 | 15 | 30 | 5 | 3 | 3 |
| 43 | 15 | 29 | 5 | 5 | 3 |
| 42 | 15 | 29 | 5 | 5 | 4 |
| 45 | 15 | 28 | 5 | 3 | 4 |
| 38.5 | 20 | 30 | 5.5 | 3 | 3 |
| 33 | 25 | 30 | 6 | 3 | 3 |
| 45 | 15 | 24 | 10 | 3 | 3 |
| 45 | 15 | 26 | 5 | 3 | 6 |
| 33 | 25 | 26 | 10 | 3 | 3 |
| 18 | 25 | 26 | 25 | 3 | 3 |
| 28 | 25 | 26 | 15 | 3 | 3 |
| 30 | 25 | 26 | 10 | 6 | 3 |
| 33 | 25 | 26 | 10 | 3 | 3 |
| 44 | 15 | 30 | 5 | 3 | 3 |

Other useful acrylic hydrosols include the following:

| MMA | S | 2EHMA | MOLMAN | HEA | MAA |
|---|---|---|---|---|---|
| 29 | 15 | 34 | 5 | 3 | 3 |
| 26 | 15 | 44 | 5 | 5 | 5 |
| 30 | 15 | 39 | 10 | 3 | 3 |
| 29 | 15 | 44.5 | 5 | 3 | 3 |

The hydrosol polymer can contain about 0.1-2% by weight of polymerized surface active monomers such as SAM 185 having an HLB value of 6.9, SAM 186 having an HLB value of 9.9 and SAM 187 having an HLB value of 14.0. These monomers are supplied by PPG-MAZER, Chemicals Group Technical Center, PPG Industries, Inc., 440 College Park Drive, Monroeville, Pa. These monomers are characterized by the structure:

Reactive Group (allyl)—hydrophobe—(OCH2CH2)nCH2-CH20H. where n is 1-100. Another useful surface active -monomer is the sodium salt of allyl dodecyl sulfosuccinate. These monomers are supplied by Henkel Chemical Corp., Ambler, Pa. under the trade name TREM LF-40. Mixtures of any of the above surface active monomers can be used.

The following are typically useful hydrosols that contain polymerized surface active monomers:

| MMA | STY | 2-EHMA | MACADOL | HEA | MAA: | SAM-187 |
|---|---|---|---|---|---|---|
| 29 | 15 | 45 | 5 | 3 | 3: | 1 |
| 29 | 15 | 45 | 5 | 3 | 3: | 0.5 |
| 29.5 | 15 | 42 | 7.5 | 3 | 3: | 1 |
| 30 | 15 | 39 | 10 | 3 | 3: | 1 |
| | | | | | | SAM-187/ TREM LF-40 |
| 29 | 15 | 52 | 5 | 5 | 3: | 1/0.05 TREM LF-40 |
| 29 | 15 | 52 | 5 | 5 | 3: | 1 |

About 0.1-5% by weight, based on the weight of the coating composition, of carbodiimides or polyfunctional aziridines can be added which provide for additional crosslinking sites. These compounds can be added to the acrylic latex or acrylic hydrosol or to the resulting coating composition. Typically useful carbodiimides have the following structural formula:

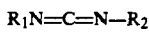

where $R_1$ and $R_2$ are alkyl groups containing 1-8 carbon atoms. One particularly useful carbodiimide is "UCARLNK" Crosslinker XL-25SE made by Union Carbide Corporation.

Useful polyfunctional aziridines include trimethylolpropane-tris-[B-(N-aziridinyl)propionate] and pentaerythritol-tris-[B-(N-aziridinyl)propionate).

Typical pigments that can be used in the composition are metallic oxides such as titanium dioxide, zinc oxide, iron oxides of various-colors, carbon black, filler pigments such as talc, china clay, barytes, carbonates, silicates, and a wide variety of organic colored pigments such as quinacridones, copper phthalocyanines, perylenes, azo pigments, indanthrone blues, carbazoles such as carbazole violet, isoindolinones, isoindolones, thioindigo reds, benzimidazolinbngs and the like.

When the coating contains metallic pigments, agents which inhibit the reaction of the pigments with water may be added. Typical inhibitors are phosphated organic materials such as "Vircopet" 40 available from Mobil Chemical Co.

The pigments can be introduced into the coating composition by first forming a mill base or pigment dispersion with either the acrylic latex or the acrylic hydrosol or with another compatible polymer or dispersant by conventional techniques such as high speed mixing, sana grinding, ball milling, attritor grinding or two roll milling. The mill base is blended with other constituents used in the composition.

The coating composition can contain about 0.01-2% by weight, based on the weight of the binder, of ultraviolet light stabilizers which includes ultraviolet light absorbers, screeners and quenchers. Typical ultraviolet light stabilizers include benzophenones, triazines, triazols, benzoates, hindered amines and blends thereof.

Thickeners and rheology control agents can be added to the coating composition in amounts of about 0.5-10% by weight of the coating composition to provide the desired spray viscosity. Typically, acrylic polymers such as polyacrylic acid, clays such as "Bentones", cellulosics, urethanes, silicas, associative thickeners such as "Rheolate" 255 or compatible mixtures of any of the above can be added.

To decrease curing time, catalysts can be added to the coating composition in amounts of 0.1-2% based on the weight of the coating composition. Typically, strong acid catalyst such as para toluene sulfonic acid, dodecyl benzene sulfonic acid and the like or the ammonium salts of these acids.

The coating composition can be applied to a plastic or metal substrate by conventional techniques such as spraying, electrostatic spraying, dipping, brushing, flowcoating and the like. The preferred method is spraying. After application, the composition is dried at ambient temperatures but can be baked at about 50°-80° C. for about 5-45 minutes to form a coating layer about 0.1-2.0 mils thick. Generally the layer is about 0.5-1.5 mils thick.

For clear coat/color coat systems, a color coat of the pigmented coating composition is applied to a substrate which may be primed with a conventional primer or primed and sealed by one of the aforementioned coating methods. Spraying is usually used. The coating is applied to a dry film thickness of about 0.1-3.0 mils. A clear coating is then applied by one of the aforementioned methods, usually spraying or electrostatic spraying is used. About 1-5 mils (dry film thickness) of the clear layer is applied. If a solvent based clear composition is applied over the pigment color coat, the color coat is first baked at the above temperatures and times or dried at ambient temperatures. The solvent based clear coating is applied and baked or air dried or dried at ambient temperatures to form a dry clear film.

Aqueous based clear coating compositions also can be used. The aqueous based clear may be the coating composition of the invention without colored pigments or another aqueous clear coating composition. These compositions can be applied and baked under the above conditions or dried at ambient temperature. If an aqueous based clear coating composition is used, it can be applied while the color coat is still wet to insure good intercoat adhesion. Preferably, the color coat is flash dried for about 1-40 minutes before the clear coat is applied.

If the coating composition is used as a clear, it is preferred to use about 0.1-5% by weight of one of the aforementioned carbodiimide or aziridinyl crosslinkers.

The acrylic hydrosol polymer can be used to form a sealer composition without the presence of the acrylic latex polymer. One preferred acrylic hydrosol polymer useful for sealers contains about 25-35% methyl methacrylate, 10-20% styrene, 35-45% 2-ethylhexyl methacrylate, 5-15% methylol methacrylamide, 1-5% 2-hydroxy ethyl acrylate and 1-5% methacrylic acid. The sealer can contain pigments in a pigment to binder ratio of about 50:100-200:100. The sealer composition can be applied to all of the aforementioned substrates using the above application techniques. Preferably, the sealer is applied by spraying. The sealer can be baked at about 20°-135° C. for about 20-60 minutes to form a dry film about 0.5-3.0 mils thick. The sealer has excellent adhesion to metals and previously painted metal substrates and prevents penetration of any subsequent coating applied such as a topcoat through to the substrate. This is required for example for refinishing an autobody part such as a fender or door.

The following example illustrates the invention. All parts and percentages are on a weight basis unless otherwise indicated. Molecular weights are determined by gel permeation chromatography using polystyrene as the standard.

EXAMPLE 1

A coating composition is prepared by first forming an methylol (meth)acrylamide acrylic polymer latex and an acrylic hydrosol and then mixing the latex and the hydrosol with the other components used in the coating composition.

| Latex A | Parts by Weight |
|---|---|
| Portion 1 | |
| Deionized water | 1320.0 |
| Nonylphenoxy polyethyleneoxy ethyl sulfate (4 moles EO) | 5.0 |
| Allyl dodecyl sulfosuccinate sodium salt | 7.0 |
| Portion 2 | |
| Deinoized water | 40.0 |
| Ammonium persulfate | 4.0 |

| Latex A | Parts by Weight |
|---|---|
| Portion 3 | |
| Methyl methacrylate (MMA) | 420.0 |
| Styrene (S) | 240.0 |
| 2-Ethylhexyl acrylate (EHA) | 776.0 |
| N-Methylolmethacrylamide monomer (MOLMAN) (60% solids aqueous solution) | 87.0 |
| Hydroxyethyl acrylate (HEA) | 48.0 |
| Methacrylic acid (MAA) | 48.0 |
| Nonylphenoxy polyethylenoxy ethyl sulfate | 14.0 |
| Ally dodecyl sulfosuccinate sodium salt | 20.0 |
| Deionized water | 928.0 |
| Portion 4 | |
| Deionized water | 30.0 |
| Aqueous ammonium hydroxide solution (28% aqueous solution) | 30.0 |
| TOTAL | 4017.0 |

Portion 1 was added to a reaction vessel equipped with a heating mantle, stirrer, thermometer, reflux condenser and two addition funnels. The resulting mixture was heated to 86° C. with mixing. Portion 2 was placed in a vessel attached to an addition funnel. Portion 3 was emulsified with an Eppenbach homogenizer. 5% of the resulting emulsion was added to the reaction vessel and the temperature of the constituents in the vessel was stabilized at 85° C. Portion 2 was then added and held for 5 minutes and then the remainder of the Portion 3 emulsion was added over a period of 90 min. at a uniform rate. The temperature of the resulting polymerization mixture was maintained at 88°-90° C. during the addition. The polymerization mixture was held at the above temperature for about 1 hour. The polymerization mixture was cooled to 35° C. and then Portion 4 was added to neutralize the latex.

The resulting latex polymer had the following composition: MMA/S/2-EHA/MOIMAN/HEA/MAA in a weight ratio of 27/15/49/3/3/3. The polymer had a weight average molecular weight of about 500,000–1,250,000. The latex had a polymer particle size of 0.094 microns, a gallon weight of 8.68 lbs/gal, pH of 8.5, percent weight solids of 38.4 and a percent volume solids 35.7.

The following latices were prepared using the above constituents and procedure except monomers as were used in the ratios shown below:
Latex    B—MMA/S/2-EHA/MOLMAN/HEA/-MAA—weight ratio 36/15/39/3/3/3
Latex    C—MMA/S/2-EHA/MOLMAN/HEA/-MAA—weight ratio 35.5/15/38.5/3/3/3
Latex    D—MMA/S/2-EHA/MOIMAN/HEA/-MAA—weight ratio 33/15/39/5/5/3.

An acrylic hydrosol was prepared as follows:

| | Parts by Weight |
|---|---|
| Portion 1 | |
| Styrene monomer | 81.5 |
| Methacrylic acid monomer | 14.3 |
| 2-Hydroxy ethyl acrylate | 26.9 |
| n-Methylol methacrylamide monomer solution (60% aqueous solution) | 61.4 |
| 2-Ethylhexyl acrylate monomer | 516.2 |
| Methyl methacrylate monomer | 370.8 |
| n-Propyl alcohol | 179.9 |
| Benzoyl peroxide | 6.1 |
| Portion 2 | |
| n-Propyl alcohol | 15.7 |
| "Butyl Cellosolve" (ethylene glycol monobutyl ether) | 68.0 |
| Tertiary butyl peracetate | 15.7 |
| Portion 3 | |
| Styrene monomer | 263.9 |
| Methacrylic acid monomer | 37.4 |
| Hydroxy ethyl acrylate monomer | 25.0 |
| n-Methylol methacrylaminde monomer aqueous solution (60% solids) | 99.1 |
| Methyl methacrylate monomer | 292.6 |
| n-Propyl alcohol | 177.5 |
| "Butyl Cellosolve" | 355.0 |
| Portion 4 | |
| Tertiary butyl peracetate | 1.0 |
| "Butyl Cellosolve" | 10.0 |
| Portion 5 | |
| Isopropyl alcohol | 993.1 |
| Total | 3611.1 |

Portion 1 was charged into a reaction vessel equipped with a stirrer, reflux condenser and two addition funnels and heated to its reflux temperature. 95 parts of Portion 2 are added to the reaction mixture over a 10 minute period and the reaction mixture was brought to its reflux temperature and held at this temperature while the remainder of Portion 2 was added over about a 10 minute period. Portion 3 was premixed and added to the reaction mixture according to the following schedule while maintaining the reaction mixture at its reflux temperature:

| Time in Minutes | Total parts added |
|---|---|
| 10 | 343.3 |
| 20 | 524.2 |
| 30 | 650.3 |
| 40 | 748.6 |
| 50 | 827.3 |
| 60 | 891.0 |
| 120 | 1119.3 |
| 180 | 1199.3 |
| 240 | 1226.7 |
| 300 | 1237.8 |
| 360 | 1242.9 |
| 420 | 1245.7 |
| 480 | 1247.2 |
| 800 | 1250.5 |

After addition of the above, the reaction mixture was held at its reflux temperature for one hour and Portion 4 was added and the reaction mixture was held at its reflux temperature for an additional hour. The reaction mixture was cooled to 80° C. and then Portion 5 was added with mixing.

The resulting polymer solution had a polymer solid content of about 50% and a weight average molecular weight of about 40,000. The composition of the polymer is as follows: MMA/S/2-EHA/MOLMAN/-HEA/MAA in a weight ratio of 31/22/34/7/3/3.

An aqueous hydrosol was prepared from the above polymer solution by mixing about 1212 parts of the above polymer solution with 1604 parts of deionized water and 129 parts of 28% aqueous ammonium hydroxide solution. The resulting hydrosol contained 20% polymer solids.

A Primer Composition was prepared as follows:

Millbase preparation:

| | Parts by Weight |
|---|---|
| Triton X-100 (nonionic surfactant - nonyl phenoxy ethyleneoxy ethanol 10 moles EO) | 1.38 |
| Deionized water | 39.62 |
| Aqueous ammonium hydroxide solution (29% solution) | 0.39 |
| "Tamol" 901 (made by Rohm & Hass, ammonium salt of acrylic copolymer dispersant) | 1.48 |
| Talc | 34.25 |
| Aluminum silicate pigment | 17.13 |
| Carbon black pigment | 0.04 |
| Titanium dioxide pigment | 5.71 |
| Total | 100.00 |

The above constituents are charged into a sand mill and ground to form a uniform dispersion.

The following ingredients were added in order with mixing to form a primer:

| | Parts by Weight |
|---|---|
| Pine oil | 7.20 |
| Latex A (prepared above) | 216.22 |
| Acrylic Hydrosol (prepared above) | 100.00 |
| Blend 1 (deionized water 23.57, "Butyl Cellosolve" 3.58, aqueous ammonium hydroxide solution 1.57 and "Acrysol" TT615-Rohm & Hass acrylic acid copolymer thickener 4.10) | 14.40 |
| Mill base (prepared above) | 315.07 |
| Total | 652.89 |

The resulting primer composition has a solids content of about 42%, and a pigment/binder ratio of 180:100.

The primer was sprayed onto cold-rolled steel panels and dried at ambient temperatures. The primer had a dry film thickness of about 1.8–2.2 mils.

A silver basecoating composition was prepared by mixing together the following constituents in the order shown and thoroughly blending these constituents:

| | Parts by Weight |
|---|---|
| Ethylene glycol monobutyl ether | 13.42 |
| Inhibitor solution (phosphated organic material) | 10.68 |
| Aluminum flake paste (65% solids in mineral spirits) | 23.04 |
| Ethylene glycol monobutyl ether | 14.96 |
| Blend 1 (described above) | 30.00 |
| Deionized water | 198.00 |
| Latex A (prepared above) | 193.00 |
| Acrylic Hydrosol (prepared above) | 99.50 |
| Total | 582.60 |

The resulting coating composition had a volume solids content of 15.04%, and a pigment/binder ratio of 15/100.

The basecoat was sprayed onto the above prepared primed cold-rolled steel panels and cured at ambient temperatures for 7 days. The resulting basecoat had a dry film thickness of about 0.6–0.8 mils. A clear coating of a solvent based two component acrylic urethane was spray applied and the coating was cured at ambient temperatures for about 7 days and the clear coat had a dry film thickness of about 1.8–2.1 mils and had an excellent appearance.

The coating on the panels had the following properties:
- Appearance—excellent
- 20° Gloss = 102.7
- Distinctness of image—82.2
- Flop—10.52
- Dry crosshatch and tape adhesion = 10
- Humidity resistance (96 hour at 38° C./100% rel. humidity):
  - Crosshatch adhesion = 10
  - Blistering = 10

Rating system 0–10, 10 best, 0 worst.

EXAMPLE 2

The following constituents were blended together to form a clear coating composition:

| | Parts By Weight |
|---|---|
| Portion 1 | |
| Latex A (prepared in Example 1) | 277.0 |
| Portion 2 | |
| Deionized water | 52.0 |
| "Butyl Cellosolve" (described in Example 1) | 30.0 |
| Portion 3 | |
| Byk 307 (acrylic flow control agent) | 0.6 |
| Ultraviolet light stabilizers | 4.0 |
| Acrylic Hydrosol (made according to Example 1 except following monomers used MMA/S/2EHMA/MOLMAN/HEA/MAA in a weight ratio of 29/15/45/5/3/3 where 2EHMA is 2 hydroxy ethyl methacrylate and having about the same weight average molecular weight as the acrylic hydrosol polymer of Example 1) | 80.0 |
| "Acrysol" TT-615 Acrylic Thickener (described in Example 1) | 0.5 |
| Total | 444.1 |

Portion 1 was charged into a mixing vessel and Portion 2 was premixed and charged into the mixing vessel and thoroughly mixed with Portion 1 and the constituents of Portion 3 were added in the order shown with mixing to form the clear coating composition.

The above clear coating composition can be sprayed onto primed steel panels coated with the silver basecoating composition of Example 1. The resulting clear coated panels are expected to have excellent clarity, good gloss and distinctness of image, good water spot resistance, good solvent resistance and excellent chip resistance.

EXAMPLE 3

A sealer composition was formed by first preparing a mill base and then blending the mill base with the other compounds of the composition.

MILL BASE

| | Parts by Weight |
|---|---|
| Deionized water | 420.1 |
| "Tamol" 901 (described in Example 1) | 1.9 |
| Aqueous ammonium hydroxide solution (described in Example 1) | 2.6 |
| Triton X-100 (described in Example 1) | 4.4 |
| Talc | 380.0 |

-continued

MILL BASE

| | Parts by Weight |
|---|---|
| Aluminum silicate pigment | 190.0 |
| Nopco 1497V (defoaming agent) | 1.0 |
| Total | 1000.0 |

The above constituents are charged into a conventional sand and ground to form a uniform dispersion.

The following ingredients were added in the order shown and mixed to form a sealer composition:

| | Parts by Weight |
|---|---|
| Mill Base (prepared above) | 254.5 |
| Acrylic Hydrosol (prepared according to the process of Example 1 except the following monomers are used MMA/S/2-EHMA/MOLMAN/ HEA/MAA in a weight ratio of 30/15/39/10/3/3) | 725.5 |
| "Acrysol" TT-615 Thickener (described in Example 1) | 20.0 |
| Total | 1000.0 |

The sealer composition was sprayed onto an autobody panel coated with an original equipment automotive acrylic enamel and flash dried at ambient temperatures for about 30 minutes to provide a smooth surface over which a water based or solvent based color coat and a clear coat can be applied and dried and cured to form a finish with excellent appearance and good physical properties. No loss of adhesion to the substrate is expected under weathering and exposure to high humidity conditions nor is penetration of the color coat through the sealer to the substrate expected.

EXAMPLE 4

An acrylic hydrosol was prepared as follows:

| | Parts by Weight |
|---|---|
| Portion 1 | |
| Anhydrous isopropyl alcohol | 589 |
| Portion 2 | |
| Methyl methacrylate monomer | 1005 |
| Styrene monomer | 521 |
| 2-Ethyl hexyl methacrylate monomers | 1561 |
| n-Methylol methacrylamide monomer solution (60% aqueous solution) | 316 |
| 2-Hydroxy ethyl acrylate monomer | 104 |
| Methacrylic acid monomer | 104 |
| Isopropyl alcohol | 175 |
| SAM-187 (polymerizable surface active monomer, HLB value 14.0, having allyl reactive group - hydrophobe - $(OCH_2CH_2)_nCH_2CH_2$—OH) | 35 |
| Ethylene glycol monobutylether | 420 |
| Portion 3 | |
| Isopropyl alcohol | 595 |
| t-Butyl peroxypivalate solution (75% solution in mineral spirits) | 97 |
| Portion 4 | |
| Aqueous ammonium hydroxide (28% solution) | 70 |
| Deionized water | 4470 |
| Total | 10,062 |

Portion 1 was charged into a polymerization reactor equipped with a stirrer, reflux condenser, thermocouple and two addition tubes and was heated to its reflux temperature of about 85° C. with constant stirring. Portion 2 and Portion 3 were each premixed and then added simultaneously at a rate such that Portion 2 was added over 4 hours and Portion 3 was added over 4.5 hours while the reaction mixture was being stirred and held at its reflux temperature. The reaction mixture was held at 85° C. for an additional 2 hours and then Portion 4 was added with stirring and an aqueous dispersion of the acrylic hydrosol was obtained.

The hydrosol polymer has a weight average molecular weight of about 40,000 and the composition of the polymer was as follows: MMA/S/2-EHMA/MOL-MAM/2HEA/MAA:SAM187 in a weight average ratio of 29/15/45/5/3/3:1. The dispersion has a 33.45% polymer solids content, a gallon weight of 8.38 and a pH of 8.96.

A primer was prepared using the same constituent as in Example 1 except the above prepared acrylic hydrosol was used in the place of the acrylic hydrosol of Example 1.

A silverbase coating composition was prepared using the same constituents as in Example 1 except the above acrylic hydrosol was substituted for the acrylic hydrosol of Example 1.

The above prepared primer was sprayed onto cold-rolled steel panels and dried at ambient temperatures. The primer had a dry film thickness of about 1.8-2.2 mils.

The above prepared silver basecoat was sprayed onto the above prepared primed cold-rolled steel panels and cured at ambient temperatures for 7 days. The resulting basecoat had a dry film thickness of about 0.6-0.8 mils. A clear coating of a solvent based two component acrylic urethane was spray applied and the coating was cured at ambient temperatures for about 7 days and the clear coat had a dry film thickness of about 1.8-2.1 mils and had an excellent appearance.

The coating on the panels had properties that were very similar to those of the coatings on the panels of Example 1.

What is claimed is:

1. A substrate coated with a dried and cured layer of a waterbased coating composition formed of an acrylic latex and an acrylic hydrosol and comprising about 10-30% by weight of film forming binder dispersed in an aqueous carrier and having a pH of about 7-10; wherein the binder consists essentially of a blend of an acrylic latex polymer having a particle size of about 0.06-0.20 microns and an acrylic hydrosol polymer having a particle size of less than 0.30 microns; wherein the blend consists essentially of about a. 60-90% by weight, based on the weight of the binder, of an methylol (meth)acrylamide acrylic latex polymer consisting essentially of polymerized monomers of alkyl methacrylate, alkyl acrylate or mixtures thereof, 1-15% by weight, based on the weight of the acrylic polymer, of methylol methacrylamide, methylol acrylamide or mixtures thereof, 0.5-10% by weight, based on the weight of the acrylic polymer of ethylenically unsaturated carboxylic acid having reactive carboxyl groups, 0.5-10% by weight of ethylenically unsaturated hydroxyl containing monomer and the polymer, having a glass transition temperature of −40° to +40° C. and a weight average molecular weight of 500,000 to 3,000,000, the carboxyl groups of the carboxylic acid component of the polymer are reacted with ammonia or an amine; and b. 10–40% by weight, based on the weight of the binder, of an acrylic hydrosol polymer comprising a methylol (meth)acrylamide acrylic polymer containing about 0.5–10% by weight, based on the weight of the polymer, of an ethylenically unsaturated carboxylic acid, 0.5–10% by weight, based on the weight of the polymer, of an ethylenically unsaturated hydroxyl containing monomer and having a weight average molecular weight of about 5,000–75,000 and the carboxyl groups of the carboxylic acid of the polymer are reacted with ammonia or an amine, 2. The substrate of claim 1 in which the substrate is a metal.

3. The substrate of claim 1 in which the substrate is a plastic.

4. The substrate of claim 1 in which the substrate is a plastic reinforced with fiberglass.

5. A substrate coated with a clear coat layer adhered to a color coat layer being adhered to the substrate; wherein the color coat layer is formed from a water based coating composition comprising an acrylic latex and an acrylic hydrosol and comprising about 10–30% by weight of film forming binder dispersed in an aqueous carrier and having a pH of about 7–10; wherein the binder consist essentially of a blend of an acrylic latex polymer having a particle size of about 0.06–0.20 microns and an acrylic hydrosol polymer having a particle size of less than 0.30 microns; wherein the blend consists essentially of about a. 60–90% by weight, based on the weight of the binder, of an methylol (meth)acrylamide acrylic latex polymer consisting essentially of polymerized monomers of alkyl methacrylate, alkyl acrylate or mixtures thereof, 1–15% by weight, based on the weight of the acrylic polymer, of methylol methacrylamide, methylol acrylamide or mixtures thereof, 0.5–10% by weight, based on the weight of the acrylic polymer, of an ethylenically unsaturated carboxylic acid having reactive carboxyl groups, 0.5–10% by weight, based on the weight of the acrylic polymer, of ethylenically unsaturated hydroxyl containing monomer and the polymer having a glass transition temperature of $-40°$ to $+40°$ C. and a weight average molecular weight of 500,000 to 3,000,000, the carboxyl groups of the carboxylic acid component of the polymer are reacted with ammonia or an amine; and b. 10–40% by weight, based on the weight of the binder, of an acrylic hydrosol polymer comprising a methylol (meth)acrylamide acrylic polymer containing about 0.5–10% by weight, based on the weight of the polymer, of an ethylenically unsaturated carboxylic acid, 0.5–10% by weight, based on the weight of the polymer, of ethylenically unsaturated hydroxyl containing monomer and having a weight average molecular weight of about 5,000–75,000 and the carboxyl groups of the carboxylic acid of the polymer are reacted with ammonia or an amine and contains pigments in a pigment to binder weight ratio about 1:100–200:100.

6. The coated substrate of claim 5 wherein the clear layer is a two component acrylic urethane coating composition.

7. A coated substrate of claim 5 wherein the clear layer is the same coating composition as the color layer except no pigment is present.

* * * * *